Figure 4:
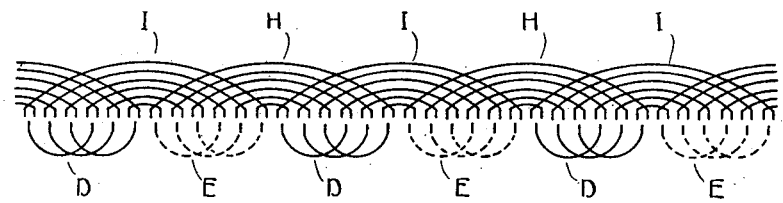

No. 733,341. PATENTED JULY 7, 1903.
C. P. STEINMETZ.
VARIABLE SPEED INDUCTION MOTOR.
APPLICATION FILED JAN. 31, 1903.
NO MODEL. 2 SHEETS—SHEET 1.

Witnesses.
J. Ellis Glenn.
Helen Orford

Inventor.
Charles P. Steinmetz.
by Albert G. Davis
Atty.

No. 733,341. PATENTED JULY 7, 1903.
C. P. STEINMETZ.
VARIABLE SPEED INDUCTION MOTOR.
APPLICATION FILED JAN. 31, 1903.
NO MODEL. 2 SHEETS—SHEET 2.

Witnesses.
Inventor.
Charles P. Steinmetz.

No. 733,341. Patented July 7, 1903.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

VARIABLE-SPEED INDUCTION-MOTOR.

SPECIFICATION forming part of Letters Patent No. 733,341, dated July 7, 1903.

Application filed January 31, 1903. Serial No. 141,235. (No model.)

*To all whom it may concern:*

Be it known that I, CHARLES P. STEINMETZ, a citizen of the United States, residing at Schenectady, in the county of Schenectady, State of New York, have invented certain new and useful Improvements in Variable-Speed Induction-Motors, of which the following is a specification.

My invention relates to alternating-current induction-motors; and it consists of a novel arrangement of windings by means of which such motors may be efficiently operated at a plurality of different speeds.

In my Patent No. 587,340, granted August 3, 1897, I have shown how a plurality of motors connected to a common load may be operated in such a manner that the speed at which the load is driven will be substantially equal to the speed of a single motor having a number of poles equal to the sum of all the poles in all the motors. In a system arranged according to the principles of the aforesaid patent the primary or inducing winding of one of a number of motors is connected to a suitable source of supply, the corresponding secondary or induced winding is electrically connected to the primary winding of a succeeding motor, and the secondary winding of the latter motor is closed upon itself in case the system comprises only two motors or is connected to the primary winding of a third motor in case more than two motors are employed. Whatever the number of motors, the secondary winding of the last motor is closed upon itself either directly or through a suitable resistance. In such a system the speed of the second motor, if only two motors are used, will correspond to the frequency of the current supplied by the secondary winding of the first motor, while the speed of the first motor will correspond to the difference between the frequency of the source of supply and the frequency of the current supplied to the second motor, so that if both motors have the same number of poles the sum of their speeds will be substantially equal to the speed at which each motor would run if it were connected by itself alone to the source of supply. If two such motors are connected to a common load, the load will be driven at a speed equal to one-half the normal speed of either of the motors operating alone, and the speed at which the load is driven may be varied by arranging different combinations of the motor-windings in the manner described in my patent aforesaid.

The system of speed control for induction-motors above described is now well known in the art and is commonly termed the "concatenation" system of speed control.

It is the aim of my present invention to do away with the necessity of employing a plurality of motors and to secure the advantages of the system above referred to by so arranging the windings of a single motor that it may be operated in substantially the same manner as a plurality of motors have been heretofore operated.

In carrying my invention into effect I place upon the primary member of the motor a winding comprising two sets or sections, each part of each section covering two poles, and I provide switches for connecting both sections of the winding to a suitable source of supply or for connecting one of the said sections to the source of supply and short-circuiting the other on itself either directly or through a suitably-proportioned resistance. The secondary member of the motor is provided with a winding of such a character that it will act as a short-circuited secondary when the two sections of the winding on the primary member are connected to the source of supply and as a transfer-winding for generating currents by induction in the short-circuited section on the primary member when one of the sections of the winding on the said member is connected to the source of supply and the other is short-circuited on itself.

My invention will be better understood by reference to the following description, taken in connection with the accompanying drawings, in which—

Figure 1:
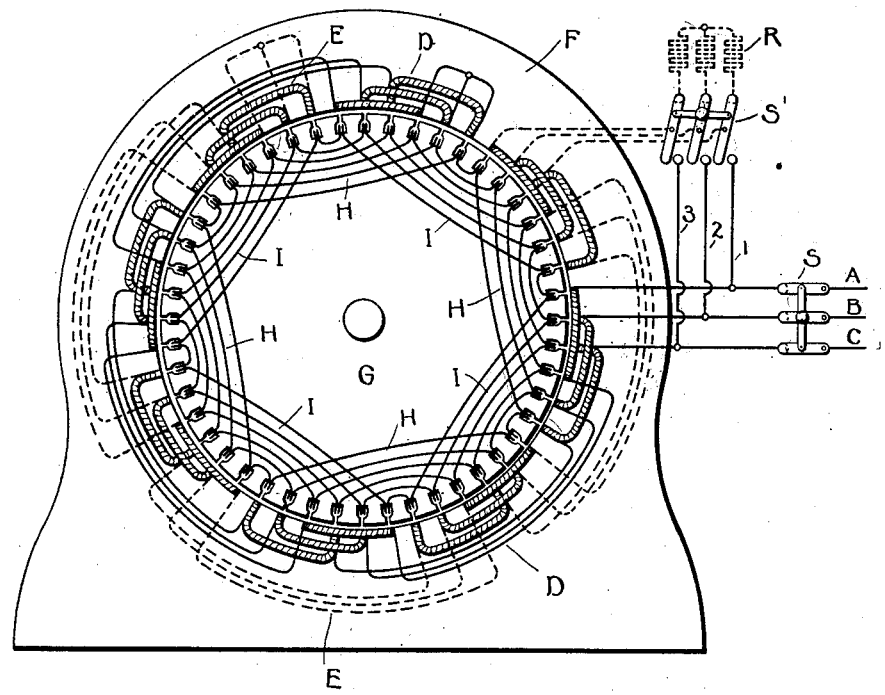
Figure 2:
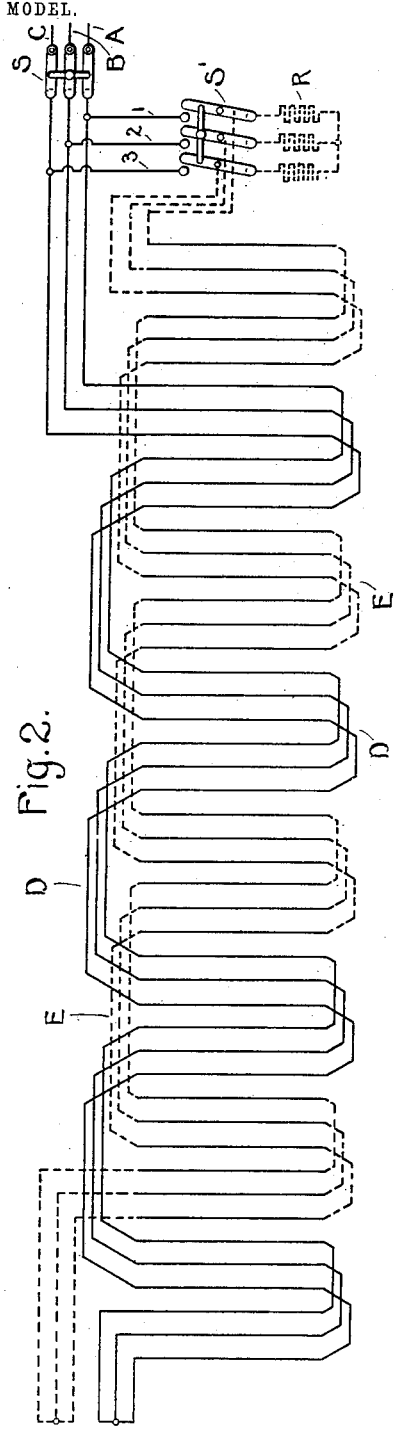
Figure 3:
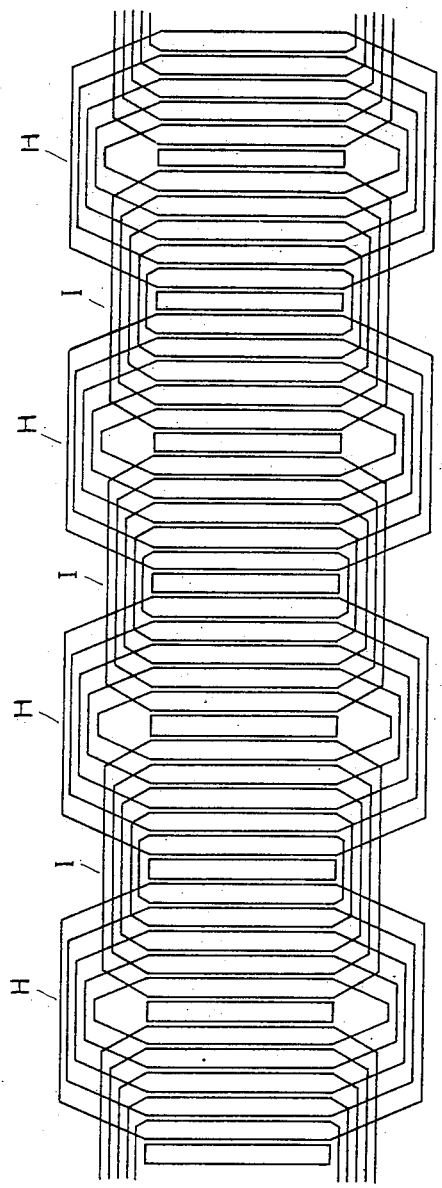

Figure 1 is an elevation showing in diagram the distribution of the windings and the circuit connections of the same in a motor embodying my invention. Fig. 2 is a development of the windings upon the primary member of the motor shown in Fig. 1. Fig. 3 is a similar development of the windings upon the secondary member; and Fig. 4 is a diagrammatic view showing the relative positions of a part of the conductors of the primary and secondary members, the pole-faces being in this figure developed upon a surface at right angles to the plane of the paper, so that the conductors are viewed from one end, as in Fig. 1. Figs. 2 and 3 are so placed on the sheet as to show the relative positions of the windings on the primary and secondary members in the position of the members shown in Fig. 1, each part of the winding on the secondary member being considered as lying opposite that part of the winding on the primary member which is shown directly above it.

Referring to the drawings, in which I have shown my invention applied to a motor wound for three-phase currents, A, B, and C represent three-phase supply-mains arranged to be connected to the motor-windings by means of a switch S. The primary member F of the motor is provided with two sets of three-phase windings D and E, each part of each set covering two poles and the parts of the different sets alternating in position around the periphery of the member on which they are mounted. The displacement between the two sets of windings is such that there will be a minimum of direct induction between the windings of the two sets, so that practically the two sets of windings are in inductive relation only through the winding on the secondary member. By means of the switch S' the winding E may be connected to the source of supply through the conductors 1, 2, and 3 or may be short-circuited on itself through a set of connections R, which may or may not contain resistance. The two sets of windings D and E may be readily distinguished in the figures from the fact that the end connections of the set E are represented by dotted lines, while the corresponding connections of the set D are represented by full lines. Both windings are shown connected in Y; but they may be connected in any other suitable relation without affecting the operation of the motor, and, of course, in place of the three-phase winding shown a winding adapted for a current of any number of phases other than three might be employed.

The secondary member G, I have shown provided with a non-overlapping quarter-phase winding of one hundred per cent. mean pitch, the coils being of the pancake type, with their turns individually short-circuited. The winding comprises two sets of conductors H and I, each of the sets constituting one of the phases of the secondary winding. The coils are wound in equally-spaced slots, each slot containing one side of a coil in each phase.

The operation of the motor is as follows: For half-speed the switch S is thrown to connect the winding D to the source of supply and the switch S' is thrown into position to short-circuit the winding E on itself. When thus connected, the winding D will operate as a primary to induce currents in the winding on the secondary member, while the winding E will operate as the tertiary of a concatenated system with alternate pairs of poles forming concatenated couples, so that the motor will operate at a speed which is equal to the speed of an induction-motor of the ordinary type having a number of poles equal to the sum of the poles produced by both windings of the motor under consideration. For full speed the switch S is thrown into the position to connect the winding E to the source of supply in multiple with the winding D. Both windings D and E will then operate as primary windings to induce current in the windings on the secondary member and the motor will operate at a speed corresponding to the speed of an induction-motor of the ordinary type having a number of poles equal to the number produced by one of the sets of windings. The speed of the motor may therefore be raised or lowered at will by manipulation of the switch S'.

The character of the windings employed may be modified and the number of sets of windings varied without departing from my invention. I therefore desire it to be understood that the invention is not limited to the particular arrangement shown in the drawings.

What I claim as new, and desire to secure by Letters Patent of the United States, is—

1. In an induction-motor, the combination of a primary member provided with a plurality of sets of windings, and a secondary member having its windings arranged to act as a short-circuited secondary and as a transfer-winding for connecting the sets of windings on the primary member in concatenation.

2. In an induction-motor, the combination of a primary member having windings producing sets of poles, and a secondary member having a winding adapted to place said sets of poles in concatenation.

3. In an induction-motor, the combination of a primary member having windings producing sets of poles, and a secondary member having a winding adapted to place said sets of poles in concatenation when the windings on said primary member are connected in certain relations, and to act as a short-circuited secondary for the windings on said primary member when the windings on said primary member are connected in certain other relations.

4. In an induction-motor, the combination of a primary member having two sets of windings each of said sets of windings producing a set of poles alternating with those produced by the other set, and a secondary member having a winding adapted to act as a transfer-winding to place said sets of poles in concatenation when one of said sets of windings is closed upon itself and the other is connected to suitable supply-mains or as a short-circuited secondary for both of said sets of windings when said sets of windings are connected to the supply-mains.

5. In an induction-motor, the combination of a primary member having two sets of windings each of said sets of windings producing a set of poles alternating with those produced by the other set of windings, and a secondary member having a winding adapted to act as a transfer-winding to place said sets of poles in concatenation when one of said sets of windings is closed upon itself and the other set is connected to suitable supply-mains, and to act as a short-circuited secondary for both of said sets of windings when said sets of windings are connected to the supply-mains, and means for alternately closing one of said sets of windings upon itself and connecting it across the supply-mains.

6. In an induction-motor, the combination of a primary member having two sets of windings each of said sets of windings producing a set of poles alternating with those produced by the other set, a secondary member provided with a quarter-phase non-overlapping winding of one hundred per cent. mean pitch composed of individually short-circuited conductors, means for connecting and disconnecting one of said sets of windings on said primary member to and from suitable supply-mains, and means for closing the windings of the other set upon itself or connecting them to said supply-mains.

7. In an induction-motor, the combination of a primary member having two sets of windings each of said sets of windings producing a set of poles alternating with those produced by the other set, and a slotted secondary member provided with a quarter-phase winding composed of individually short-circuited coils varying in width from the distance between two adjacent sets of windings on said primary member to the distance between the farther extremities of said sets, said coils being so placed in said slots that each slot contains one side of a coil in each phase of the secondary winding.

In witness whereof I have hereunto set my hand this 28th day of January, 1903.

CHARLES P. STEINMETZ.

Witnesses:
BENJAMIN B. HULL,
MARGARET E. WOOLLEY.